United States Patent Office 3,458,388
Patented July 29, 1969

3,458,388
GLASS-POLYURETHANE-POLYVINYLBUTYRAL-
POLYURETHANE-GLASS LAMINATE
Robert E. Moynihan, Marietta, Ohio, assignor to E. I.
du Pont de Nemours and Company, Wilmington, Del.,
a corporation of Delaware
No Drawing. Filed Aug. 1, 1967, Ser. No. 657,511
Int. Cl. B32b 17/10, 27/40
U.S. Cl. 161—165                                    7 Claims

ABSTRACT OF THE DISCLOSURE

A pair of outer glass sheets laminated to each side of a composite interlayer comprising a rigid, unplasticized polyvinyl butyral or polycarbonate core having on each side an adhesive layer of a polyurethane formed from polytetramethylene ether glycol, 1,4-butanediol and tolylene diisocyanates.

BACKGROUND OF THE INVENTION

This invention relates to glass laminates and, more particularly, to composite interlayers for such laminates which contribute load-bearing strength as well as impact resistance.

Although conventional safety glass, either laminated or tempered, has been in use for many years, its use as a structural member is limited because of its complete failure, for example, under impact. The fractured glazing retains little or none of its original rigidity or load-bearing ability; tempered glass breaks into many pieces and usually disintegrates, and laminated glass fails to a relatively limp web.

SUMMARY OF THE INVENTION

In a laminated article comprising a pair of outer glass sheets secured to a composite interlayer of a resinous sheet having an adhesive layer on each side thereof; the improvement wherein said resinous sheet is (A) a rigid sheet of unplasticized polyvinyl butyral resin having a hydroxyl content of about 12 to 30 percent, or (B) a rigid sheet of a bis-phenol type polycarbonate resin, and said adhesive layer is a 0.005- to 0.03-inch layer of a polyurethane elastomer prepared by simultaneously reacting (a) polytetramethylene ether glycol having a number average molecular weight of about 800 to 2000, and (b) 1,4-butanediol, with (c) 2,4-tolylene diisocyanate or mixtures thereof containing up to about 35 weight percent 2,6-tolylene diisocyanate; the quantities of reactants being about 2 to 3.5 moles of butanediol per mole of said glycol, and approximately equivalent amounts of said diisocyanate.

DETAILED DESCRIPTION OF THE INVENTION

The rigid sheet of unplasticized polyvinyl butyral (PVB) resin can be prepared by methods known to those skilled in the art. The hydroxyl content is between about 12 and 30 percent, preferably about 18 to 25 percent. The preparation of such resins is known in the art, e.g., Stamatoff, U.S. Patent 2,400,957, and the meaning and determination of "hydroxyl content" is known and described in detail, e.g., in Burk et al., U.S. Patent 2,526,728. By the term "rigid" it is meant that the PVB resin be of substantial molecular weight and substantially free from plasticizer. The molecular weight of the PVB is a function of the molecular weight of the polyvinyl alcohol used to prepare it; a molecular weight range of the polyvinyl alcohol of about 20,000 to 100,000 is representative. In general, the rigid layer will be from about 0.06 to 0.15 inch in thickness.

The polycarbonate resin is formed from a diol, e.g., bisphenol A (2,2-bis-[phenylol]-propane), and phosgene in a manner known to the art as, for example, disclosed in "Polycarbonates," W. F. Christopher and D. W. Fox, chapter 2, especially pages 13 to 20. The molecular weight is sufficiently high to provide for the formation of a rigid sheet.

The polyurethane used for the adhesive layer is the subject of assignee's U.S. application of Ahramjian, Ser. No. 631,623, filed Apr. 18, 1967, the disclosure of which is incorporated herein by reference. It is prepared by the simultaneous reaction of polytetramethylene ether glycol (PTMEG) having a molecular weight of about 800 to 2000 (preferably about 800 to 1300), and 1,4-butanediol with 2,4-tolylene diisocyanate or mixtures thereof with up to 35% of 2,6-tolylene diisocyanate. The total amount of 1,4-butanediol should be about 2 to 3.5 (preferably about 2.5 to 3) moles per mole of PTMEG. Approximately equivalent amounts of diisocyanate are employed. All reactants can be mixed and reacted simultaneously, or part of the diol and PTMEG can be reacted with the diisocyanate with subsequent addition of the remainder. The reaction can be conducted with or without solvent as long as the latter is substantially removed before lamination of the adhesive layer. The molecular weight of the polyurethane should be sufficiently high to exhibit a Brookfield viscosity of about 10,000 to 100,000 cps. at 25° C. when 35 parts are dissolved in 65 parts of methyl ethyl ketone and 1 part methanol.

The adhesive can be produced in layers of about 0.005 to 0.03 (preferably about 0.01 to 0.02) inch in thickness by conventional means, e.g., skiving solid blocks of polyurethane into sheets of desired thickness.

The glass used to form the outer layers of the laminate is at least about 0.04 inch thick but not usually greater than about 0.15 inch thick. Preferably, it ranges from about 0.05 to 0.09 inch in thickness. The glass may be annealed glass, thermally tempered or pre-stressed glass, or particularly chemically tempered glass such as "Chemcor" produced by Corning Glass Co.

The articles prepared in accordance with this invention display an exceptional combination of properties, e.g., laminar strength, support strength, and impact resistance. The clarity of the articles is surprisingly good considering the thickness and complexity of the structure. The use of many other rigid resin layers with the above adhesive as well as the use of many other adhesive layers with the above-described rigid layers have proven to be unsatisfactory. Thus, the combination of this invention is seen to yield unexpected results.

This invention describes a multilayer, rigid (flexural modulus greater than 50,000 p.s.i. at the use temperatures) polymeric sheet which can be used as a composite interlayer in laminated glass to provide a transparent structure which retains its integrity and still functions as a load-bearing structural member when the glass layers are broken. The surface durability of glass is combined in a tough construction that does not fail in a catastrophic way. The composite interlayer contains at least three plies—a central rigid core and two relatively soft exterior adhesive layers. The soft adhesive layers serve as accommodation layers to relieve stresses due to differential thermal expansion and adhere sufficiently to glass and the core material so that the components do not separate except locally when the laminate is impacted in tests simulating severe use conditions. In addition, when the glass layers are fractured, the core is tough enough so that the cracks do not propagate through the interlayer but the interlayer remains intact.

A typical use test might be the automotive glazing Society of Automotive Engineers (SAE) test in which a five-pound steel ball is dropped from 12 feet on a horizontal 12-inch x 12-inch test specimen. Laminated glass containing some of the interlayers described in this invention survive this test from 0° F. to 120° F. without splitting (the glass fractures). Except for spalling locally in the area of impact, nearly all of the fractured glass is retained and the laminate retains a good proportion of its integrity and load-bearing capability. For other uses, for example, an unframed door, the impact tests would be less severe and more of the constructions would survive them.

Laminated constructions containing the interlayers described can be used as structural members where obstructions to vision such as posts or their supports are undesirable. Architectural glazing can function as a wall or roof without visual obstruction due to posts. Transparent doors can be fabricated which will still function as a closure if the glass were broken by impact and, also, the hazard of large falling fragments would be eliminated.

The invention will now be described in connection with examples of specific embodiments thereof wherein parts and percentages are by weight unless otherwise specified.

Example 1

The adhesive can be prepared by simultaneous reaction of 1 mole of PTMEG (molecular weight about 980), 2.5 moles of 1,4-butanediol (molecular weight 90), and 3.5 moles of a mixture of isomers (80% 2,4- and 20% 2,6-) of tolylene diisocyanate (molecular weight 174) and casting a solid block of polyurethane in a mold. These are skived into sheets 0.020 inch in thickness.

A 12-inch x 12-inch x 0.10-inch sheet of unplasticized PVB having a 23% hydroxyl content is selected as the rigid sheet core. A sheet of the above adhesive is placed on each side of the core and two outer sheets of 0.08 inch thick chemically tempered glass ("Chemcor") complete the assembly. The laminated assembly is compressed at about 175° C. in a steam press under contact pressure and autoclaved at 135° C. for 9 minutes in an oil autoclave at 225 p.s.i.

The toughness of the laminate can be determined by dropping a five-pound steel ball from various heights onto the laminate supported in a horizontal frame at various temperatures (FPB test).

Typical test results indicate that in tests conducted at 70° F. and 120° F. the ball will be suported, the laminate not splitting, at drop heights up to about 20 feet and 12 feet, respectively. In tests conducted at temperatures down in the range of —6° F. to 3° F., the ball will usually remain supported at drop heights even up to 18 feet; however, in tests at heights from about 12 feet upward, some splitting may occur. The flexural modulus of the interlayer is approximately $2.6 \times 10^5$ p.s.i. at 73° F.

Example 2

Example 1 is repeated except as noted in the table below illustrating the PFB test results (in feet of drop height that the laminate will withstand). The glass layers are 0.125 inch annealed plate.

| Adhesive thickness | FPB test at— | | |
|---|---|---|---|
| | 0° F. (ft.) | 73° F. (ft.) | 120° F. (ft.) |
| 0.010 inch | 9.5 | 10 | 18 |
| 0.020 inch | >18 | >20 | >12 |

Example 3

Example 1 is repeated except that the core material is a 0.06 inch thick sheet of a bis-phenol A polycarbonate resin ("Lexan," General Electric Corp., extruded by Thermoplastic Processes Inc.). The FPB test results indicate in tests conducted at 73° F. and 0° F. that the laminate will suport the ball dropped from heights up to about 12 feet; however, at 0° F. there may be some glass detached in the impact area, top and bottom.

I claim:
1. In a laminated article comprising a pair of outer glass sheets secured to a composite interlayer of a resinous sheet having an adhesive layer on each side thereof; the improvement wherein said resinous sheet is a rigid sheet of unplasticized polyvinyl butyral resin having a hydroxyl content of about 12 to 30 percent and said adhesive layer is a 0.005- to 0.03-inch layer of a polyurethane elastomer prepared by simultaneously reacting (a) polytetramethylene ether glycol having a number average molecular weight of about 800 to 2000, and (b) 1,4-butanediol, with (c) 2,4-tolylene diisocyanate or mixtures thereof containing up to about 35 weight percent 2,6-tolylene diisocyanate; the quantities of reactants being about 2 to 3.5 moles of butanediol per mole of said glycol, and approximately equivalent amounts of said diisocyanate.

2. A laminated article as defined in claim 1 wherein said rigid sheet is a polyvinyl butyral of about 18 to 25 percent hydroxyl content from about 0.06 to 0.15 inch in thickness; and said adhesive layer is about 0.01 to 0.02 inch in thickness; and said glass sheets are about 0.04 to 0.15 inch in thickness.

3. A laminated article as defined in claim 2 wherein said glass sheets are about 0.05 to 0.09 inch in thickness.

4. A laminated article as defined in claim 2 wherein said polytetramethylene ether glycol number average molecular weight is between 800 and 1300 and the amount of butanediol is from about 2.5 to 3 moles per mole of glycol.

5. A composite interlayer, suitable for lamination between a pair of glass sheets, of a rigid sheet of an unplasticized polyvinyl butyral resin having a hydroxyl content of about 15 to 30 percent, said rigid sheet having on each side thereof an adhesive layer, about 0.005 to 0.03 inch in thickness, of a polyurethane elastomer prepared by simultaneously reacting (a) polytetramethylene ether glycol having a number average molecular weight of about 800 to 2000, and (b) 1,4-butanediol, with (c) 2,4-tolylene diisocyanate or mixtures thereof containing up to about 35 weight percent 2,6-tolylene diisocyanate; the quantities of reactants being about 2 to 3.5 moles of butanediol per mole of said glycol, and approximately equivalent amounts of said diisocyanate.

6. A composite interlayer as defined in claim 5 wherein said rigid sheet is polyvinyl butyral resin of about 18 to 25 percent hydroxyl content from about 0.06 to 0.15 inch in thickness and said adhesive layer is about 0.01 to 0.02 inch in thickness.

7. A composite interlayer as defined in claim 6 wherein said polytetramethylene ether glycol number average molecular weight is between 800 and 1300 and the amount of butanediol is from about 2.5 to 3 moles per mole of glycol.

References Cited

UNITED STATES PATENTS 3,388,032   6/1968   Saunders _____ 161—190

ROBERT F. BURNETT, Primary Examiner

W. J. VAN BALEN, Assistant Examiner

U.S. Cl. X.R.

156—106, 306; 161—183, 190, 192